(12) United States Patent
Chen et al.

(10) Patent No.: US 7,934,870 B2
(45) Date of Patent: May 3, 2011

(54) CIRCULATING STRUCTURE FOR A LINEAR GUIDEWAY

(75) Inventors: Tsung-Jen Chen, Taichung (TW); Tzu-Yu Hung, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 429 days.

(21) Appl. No.: 12/198,035

(22) Filed: Aug. 25, 2008

(65) Prior Publication Data
US 2010/0046864 A1 Feb. 25, 2010

(51) Int. Cl.
*F16C 29/06* (2006.01)
(52) U.S. Cl. ........................................................ 384/45
(58) Field of Classification Search .............. 384/43–45, 384/51
See application file for complete search history.

(56) References Cited

U.S. PATENT DOCUMENTS

| | | | | |
|---|---|---|---|---|
| 7,296,929 B2 * | 11/2007 | Hantke et al. | .................... | 384/44 |
| 7,736,060 B2 * | 6/2010 | Matsumoto et al. | ............ | 384/45 |
| 7,785,011 B2 * | 8/2010 | Reist | ................................ | 384/44 |
| 2001/0016088 A1 * | 8/2001 | Teramachi | ....................... | 384/44 |
| 2007/0071371 A1 * | 3/2007 | Kato et al. | ....................... | 384/44 |
| 2009/0290819 A1 * | 11/2009 | Lin | ................................. | 384/44 |

* cited by examiner

*Primary Examiner* — Thomas R Hannon

(57) ABSTRACT

A circulating structure for a linear guideway is arranged in a circulating assembly the linear guideway. The linear guideway includes two circulating assemblies, and each circulating assembly is provided with a circulating channel. Each circulating channel is provided with a third guiding groove. A rolling element system is arranged in the circulating channel and consists of plural rolling elements and a rolling element chain. The rolling element chain includes plural spacers and a linking portion located at both sides of the plural spacers to link them with one another. The linking portion circulates along the center line of the third guiding groove, and the third guiding grooves have a constant width.

3 Claims, 9 Drawing Sheets

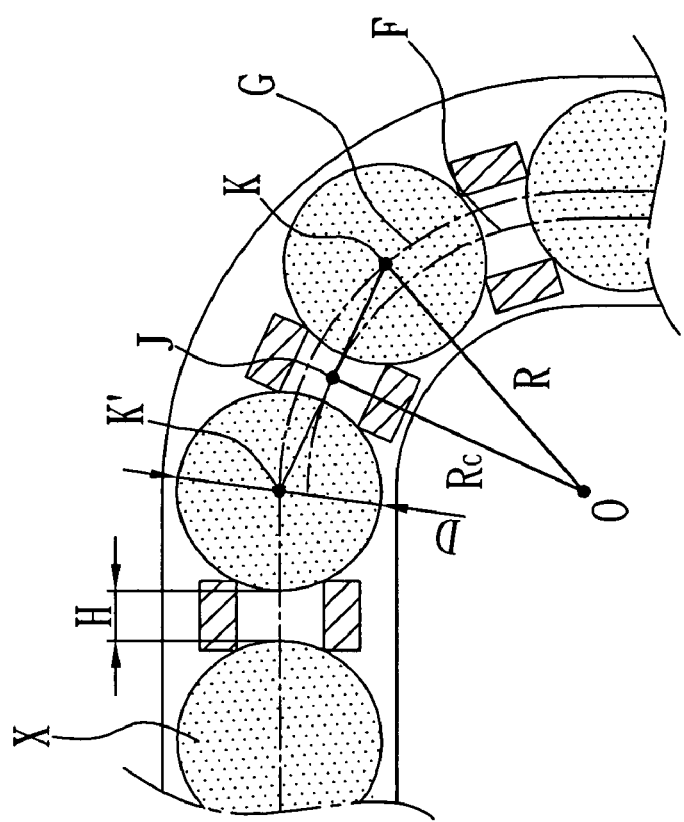
F I G. 5

CIRCULATING STRUCTURE FOR A LINEAR GUIDEWAY

FIELD OF THE INVENTION

The present invention relates to a linear guideway, and more particularly to a circulating structure for a linear guideway, cooperating with a rolling element chain to make the rolling element chain circulate more smoothly.

DESCRIPTION OF THE PRIOR ART

A common linear guideway essentially comprises a slide rail 1, a slide block 2 and plural rolling elements B. The slide rail 1 is provided with a rolling channel 11 at each of two opposite sides thereof. The slide block 2 is movably mounted on the slide rail 1 and provided with a circulating hole 21 and a rolling groove 22. The rolling elements B are arranged between the rolling groove 22 and the rolling channel 11. The rolling grooves 22 and the rolling channels 11 define a loaded path A. In order to realize the infinite circulation of the rolling elements B, the slide block 2 is generally provided with a circulating assembly 4 at each of two ends thereof, and each circulating assembly 4 is provided with a circulating channel 41 for circulation of the rolling elements B. Two ends of each circulating channel 41 are respectively linked up with the loaded path A and the circulating hole 21. Additionally, in order to reduce the noise caused during the operation of the linear guideway, the rolling elements B are generally installed in a rolling element chain 3, so as to be separated from one another for avoiding the mutual collision during circulation. The rolling elements chain 3 consists of plural spacers 31 and a linking portion 32 located at both sides of the respective spacers to link the spacers with one another. In order to make the rolling element chain 3 to circulate more smoothly, the circulating hole 21, the loaded path A and the circulating channel 41 are all designed with a guiding groove 411, and the linking portion 32 is disposed in the guiding grooves 411. With the cooperation between the guiding grooves 411 and the linking portion 32, the rolling element chain 3 can circulate more smoothly. However, when the rolling element chain 3 passes through the circulating channel 41, because the return radius of the spacer 31 of the rolling element chain 3 is smaller than that of the rolling elements B, and the return radius of the linking portion 32 restricted by the spacers 31 is the same as that of the spacers 31, the return routes of the linking portion 32 and the spacers 31 both deviate inwards, and the linking portion 32 will interfere with the guiding groove 411, thus causing the unsmooth circulation of the rolling element chain 3. A conventional solution for enabling the rolling element chain to circulate more smoothly is described as follows:

When passing through the circulating channel, the linking portion 32 of the rolling element chain 3 will deviate toward the inner side of the circulating channel 41, so the conventional technology is to enlarge the width of the inner side of the guiding groove of the circulating channel 41 to provide enough deviation space required for the linking portion 32, while the profile of the outside arc is kept tangential to the guiding portions of the circulating hole 21 and the loaded path A. If the guiding groove is too large, more freedom will be provided to the linking portion 32, so that when the slide block 2 vertically move toward the ground, the linking portion 32 is likely to bend badly, thus accelerating the fatigue fracture of the linking portion 32. The present invention has arisen to mitigate and/or obviate the afore-described disadvantages.

SUMMARY OF THE INVENTION

The primary objective of the present invention is to provide a circulating structure for a linear guideway to avoid the bending deformation of the linking portion of the rolling element chain.

In order to achieve the above objective, the circulating structure for a linear guideway in accordance with the present invention is arranged in the circulating assembly of the linear guideway, and the linear guideway comprises:

A slide rail is provided with at least one rolling groove at each of two opposite sides thereof.

A slide block is movably mounted on the slide rail and provided with rolling channels opposite to the rolling grooves of the slide rail, the rolling channels and the rolling grooves define a loaded path including two first guiding grooves, the slide block is further provided with a circulating hole which doesn't intersect with the rolling channels, the circulating hole is provided with two second guiding grooves.

Two circulating assemblies are respectively arranged at two opposite ends of the slide block, each circulating assembly is provided with a circulating channel, both ends of the circulating channel of each circulating assembly are linked up with the loaded path and the circulating hole to define a closed circulating path, the circulating channel of each circulating assembly is provided with two third guiding grooves, which are linked up with the second guiding grooves and the first guiding grooves to define a closed guiding groove system with a constant width.

Plural rolling elements are installed in a rolling element chain to form a rolling element system, the rolling element chain is provided for separating the rolling elements from one another, so as to avoid collision of the rolling elements during circulation, the rolling element chain includes at least one and one linking portion, the rolling element system is arranged in the loaded path, the circulating hole and the circulating channels, the linking portion of the rolling element chain is arranged in the guiding groove system, the width of the guiding groove system is larger than a width of the linking portion, the path along which the linking portion circulates overlaps with the center lines of the third guiding grooves.

As described above, when passing through the circulating channel of the circulating assembly, the linking portion of the rolling element chain will deviate inwards, thus causing the linking portion to interfere with the third guiding groove. In order to solve the above problem, based on the trigonometric relations and the similar triangle principle, the path along which the rolling element chain circulates within the circulating channel can be determined. Taking the rolling element chain path as the center line of the third guiding groove, the third guiding groove can be formed in such a way that both sides of the third guiding groove are apart from the center line a predetermined distance, so that the return route along which the linking portion circulates overlaps with the center line of the third guiding groove, thus avoiding the bending deformation of the linking portion and making the rolling element circulate more smoothly.

BRIEF DESCRIPTION OF THE DRAWINGS

FIG. 5 is a schematic view showing how to obtain the relation between the return radius of curvature Rc of the linking portion of the rolling element chain, the rolling element return radius of curvature R;

DETAILED DESCRIPTION OF THE PREFERRED EMBODIMENTS

Figure 1:
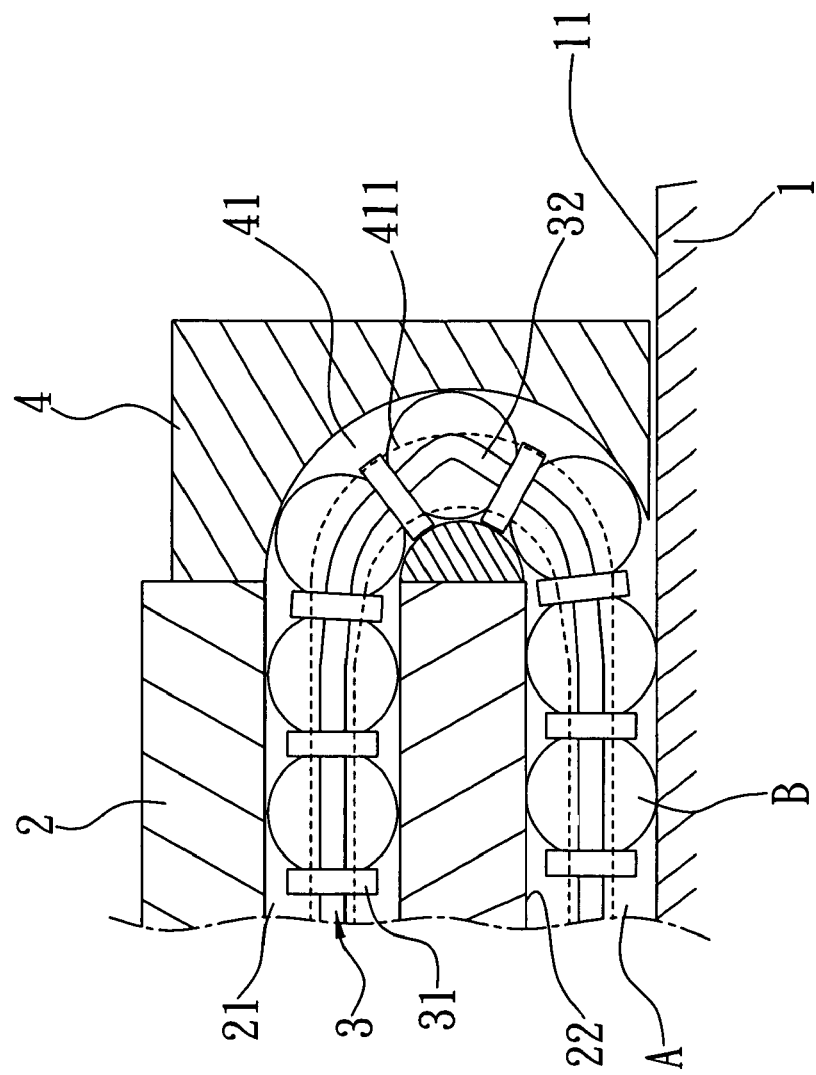
FIG. 1 is a cross-sectional view showing the relation between a guiding groove in a conventional circulating channel and the linking portion of a rolling element chain.
Figure 2:
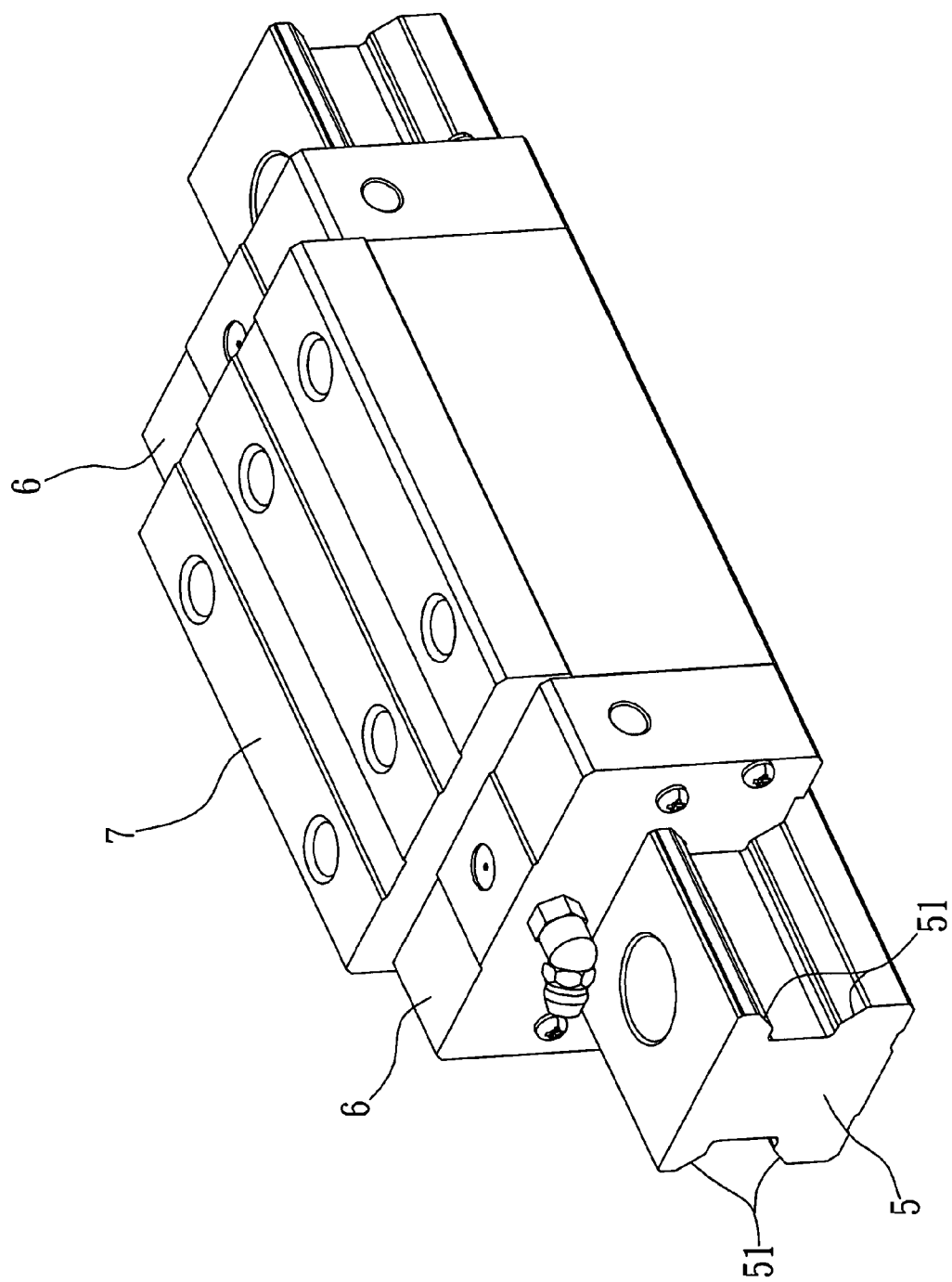
FIG. 2 is a perspective view of a linear guideway in accordance with the present invention.
Figure 3:
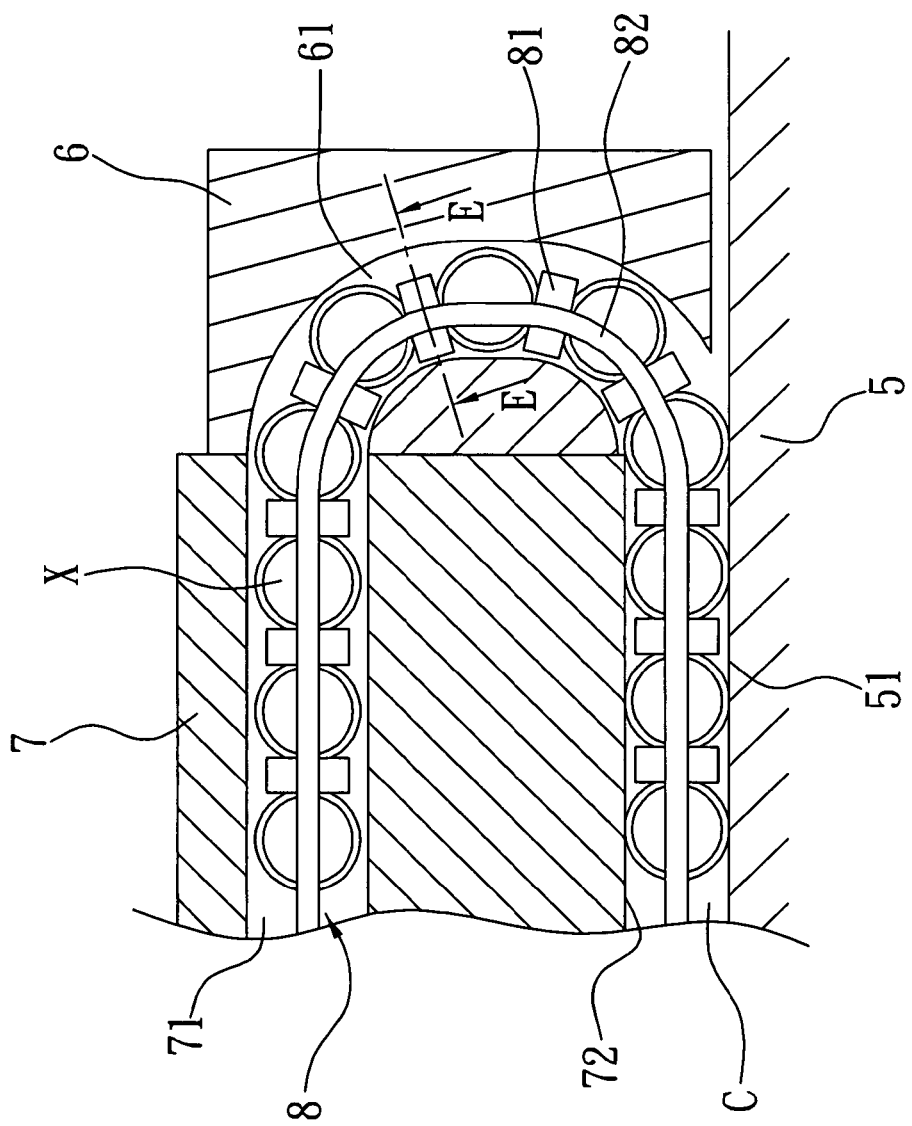
FIG. 3 is a cross-sectional view showing the relation between a guiding groove in accordance with the present invention and the linking portion of a rolling element chain.
Figure 4:
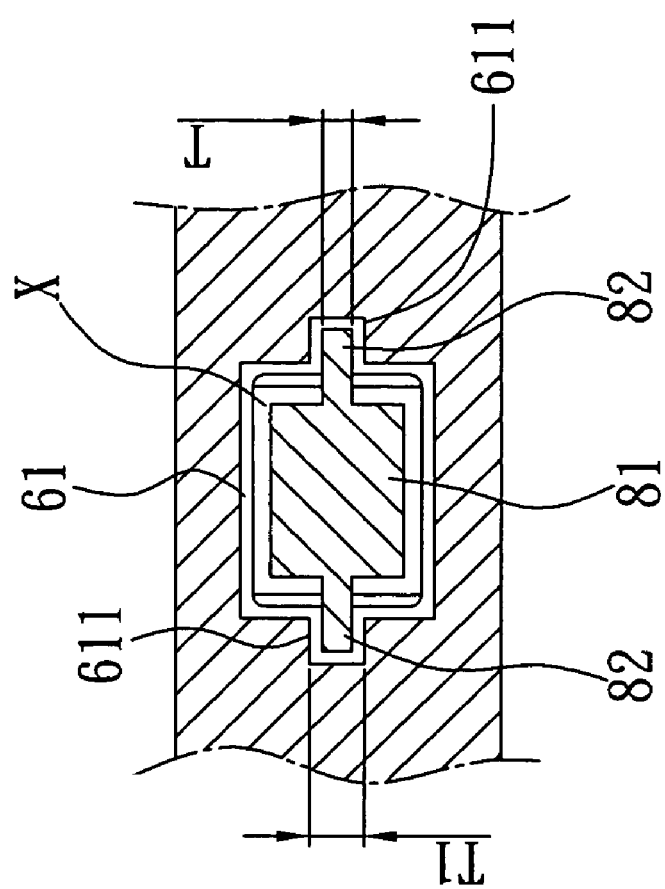
FIG. 4 is a cross-sectional view of FIG. 3 along the line E-E.

The present invention will be clearer from the following description when viewed together with the accompanying drawings, which show, for purpose of illustrations only, the preferred embodiment in accordance with the present invention.

Referring to FIGS. 2-9, a circulating structure for a linear guideway in accordance with the present invention is arranged in a circulating assembly of the linear guideway comprising a slide rail 5, a slide block 7, two circulating assemblies 6 and plural rolling elements X.

The slide rail 5 is provided with at least one rolling groove 51 at each of two opposite sides thereof.

The slide block 7 is movably mounted on the slide rail 5 and provided with rolling channels 72 opposite to the rolling grooves 51. The rolling grooves 51 and the rolling channels 72 define a loaded path C, which includes two first guiding grooves C1 (the first guiding grooves C1 can be disposed in two manners: the first is to machine the first guiding grooves C1 directly in the rolling grooves 51 and the rolling channels 72, and the second is to machine the first guiding grooves C1 in the accessories such as: retainer, dustproof device, etc). The slide block 7 is further proved with a circulating hole 71 which doesn't intersect with the rolling channels 72. The circulating hole 71 is provided with two guiding grooves 711.

The two circulating assemblies 6 are respectively arranged at two opposite ends of the slide block 7. Each circulating assembly 6 is provided with a circulating channel 61, and both ends of each circulating channel 61 are respectively linked up with the loaded path C and the circulating hole 71 to define a closed circulating path. Each circulating channel 61 is provided with two third guiding grooves 611. The third guiding grooves 611 are linked up with the second guiding grooves 711 and the first guiding grooves C1 to define a closed guiding groove system with a constant width T1.

The rolling elements X are installed in a rolling element chain 8 to form a rolling element system. The rolling element chain 8 is provided for separating the rolling elements X from one another, so as to avoid the collision of the rolling elements X during circulation. The rolling element chain 8 includes plural spacers 81 and a linking portion 82 located at both sides of the respective spacers 81 to link the spacers 81 with one another. The rolling element system is arranged in the loaded path C, the circulating hole 71 and the circulating channel 61.

The linking portion 82 of the rolling element chain 8 is arranged in the guiding groove system. The width T1 of the guiding groove system is larger than the width T of the linking portion 82. The path along which the linking portion 82 circulates overlaps with the center lines of the third guiding grooves 611.

The design principle of the third guiding grooves 611 of the circulating channels 61 is described as follows:

Firstly, referring to FIG. 5, the linking portion 82 of the rolling element chain 8 is provided for linking the spacers 81 with one another, so the return radius of the linking portion 82 is the same as that of the spacers 81. The respective spacers 81 are located between two adjacent rolling elements X. R denotes the return radius of curvature of the rolling elements X, D denotes the diameter of the rolling elements X, and H denotes the closest distance between two rolling elements X. The center J of the spacer 81 is located on the straight line KK' defined by the centers of two adjacent rolling elements X, so the line segment JK is vertical to the return radius of curvature Rc of the linking portion 82 of the rolling element chain 8. Hence, based on the trigonometric relations, the relation between the return radius of curvature Rc of the rolling element chain 8 (it can also be the linking portion 82 or the spacers 81) and the return radius of curvature R of the rolling elements X can be expressed as follows:

$$R^2 = R_C^2 + (D/2 + H/2)^2$$

The length of the line segment JK is equal to (D/2+H/2), so the return radius of curvature Rc of the rolling element chain 8 (the linking portion 82 or the spacers 81) satisfies the relation:

$$R_C = \sqrt{R^2 - (D/2 + H/2)^2}$$

Figure 6:
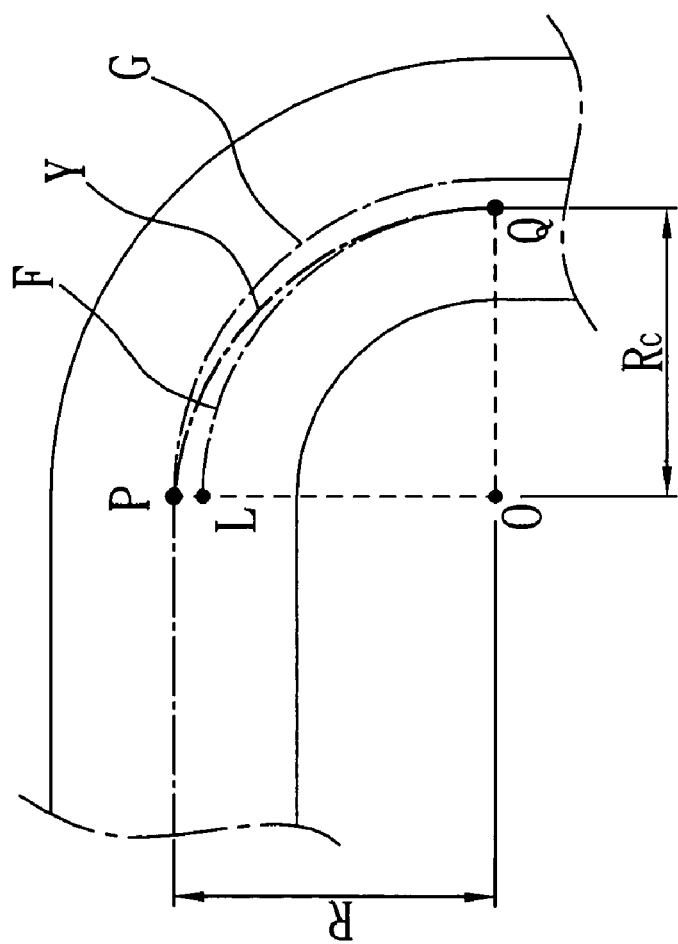
FIG. 6 is a schematic view showing how to determine the two end points of the guiding groove in the circulating channel.

Next, referring to FIG. 6 illustrating how to find out two end points of an optimal circulating path within the circulating channel 61 for the rolling element chain 8, in other words, an optimal circulating path for the rolling element chain 8 between the rolling element chain path F and the rolling element path G, when the rolling element chain 8 circulates along the straight line segment, the centers J of the spacers 81 (the centers J of the spacer 81 are located on the center line of the linking portion 82) and the centers K of the rolling elements X are located on the same straight line (as shown in FIG. 5). Therefore, the end point at which the spacers 51 (the linking portion 82) starts to enter into the circulating channel 61 is also aligned with the centers K of the rolling elements X, so that the end point P of the rolling element path G rather than the end point L of the rolling element chain path F is taken as the end point at which the rolling element chain 8 starts to enter into the circulating channel 611, and the distance between the point P and the return center O of the rolling elements X is the return radius of curvature R of the rolling elements X. After linking portion 82 enters into the third guiding groove 611 of the circulating channel 61, the return radius of curvature of the rolling element chain 8 is the return radius of curvature Rc of the linking portion 82. Hence, the other end point of the third guiding groove 611 is the point Q, so that the distance between the point Q and the return center O of the rolling elements is the return radius of curvature Rc of the linking portion 82 of the rolling element chain 8, and the curve defined by the points P, Q is the center line Y of the third guiding groove 611.

Figure 7:
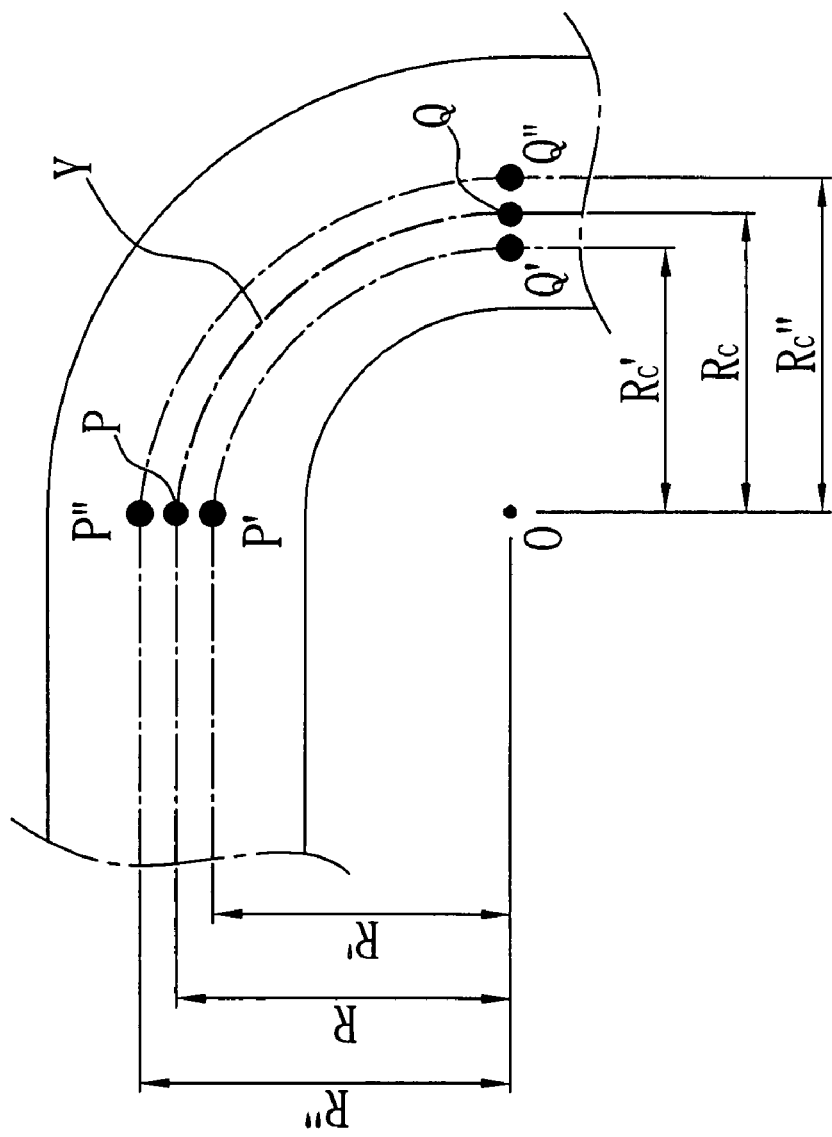
FIG. 7 illustrates that the widths of the guiding grooves are constant.

Subsequently, referring to FIGS. 7 and 9, in order to enable the guiding groove system to guide the rolling element chain 8 to circulate more smoothly, the width T1 of the guiding groove system is required to be larger than the width T of the linking portion 82, and the width T1 of the guiding groove system is constant, so as to avoid the overbending deformation and fracture problems of the linking portion 82 during circulation. Therefore, both sides of each of the third guiding grooves 611 of the circulating channels 61 are apart from the center lines Y of the third guiding grooves 611 a predetermined distance. As known from FIG. 7, an inside surface of third guiding groove 611 is an arc defined by the point P' and the point Q' in cross section, R' denotes the distance between the point P' and the return center O of the rolling elements X, and Rc' denotes the distance between the point Q' and the return center O of the rolling elements X, and the outside surface of the third guiding groove 61 is an arc defined by the point P'' and the point Q'' in cross section, R'' denotes the distance between the point P'' and the return center O of the rolling elements X, and Rc'' denotes the distance between the point Q'' and the return center O of the rolling elements X, wherein:

$$R'=R-T1/2; R_C'=R_C-T1/2$$

$$R''=R+T1/2; R_C''=R_C+T1/2$$

The above equations are used to prove that the widths of all the guiding grooves (the first guiding grooves C1, the second guiding grooves 711, and the third guiding grooves 611) are constant.

Figure 8:
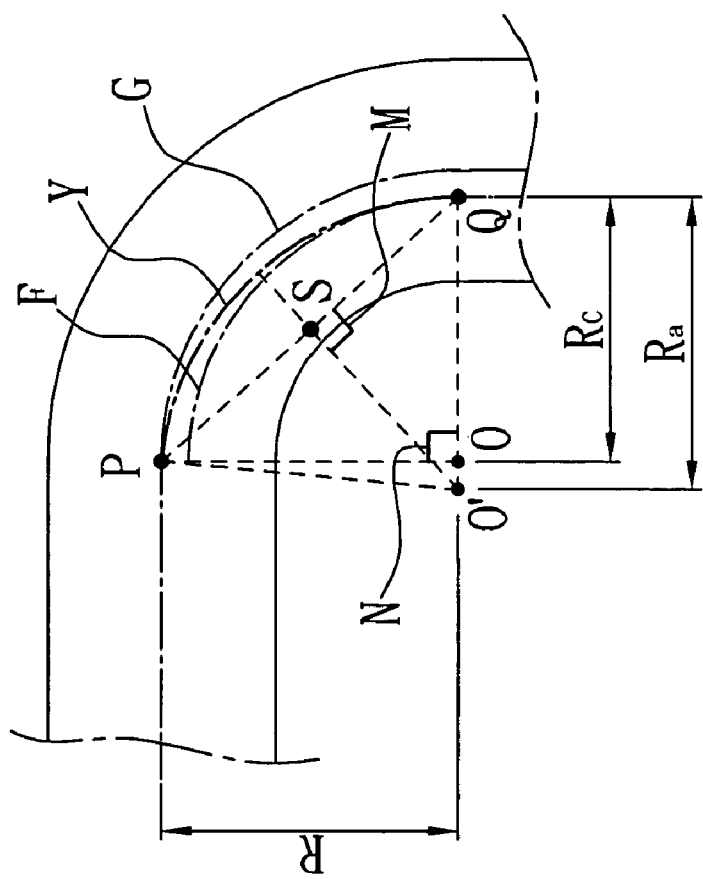
FIG. 8 illustrates how the radius of the guiding groove in the circulating channel is designed.
Figure 9:
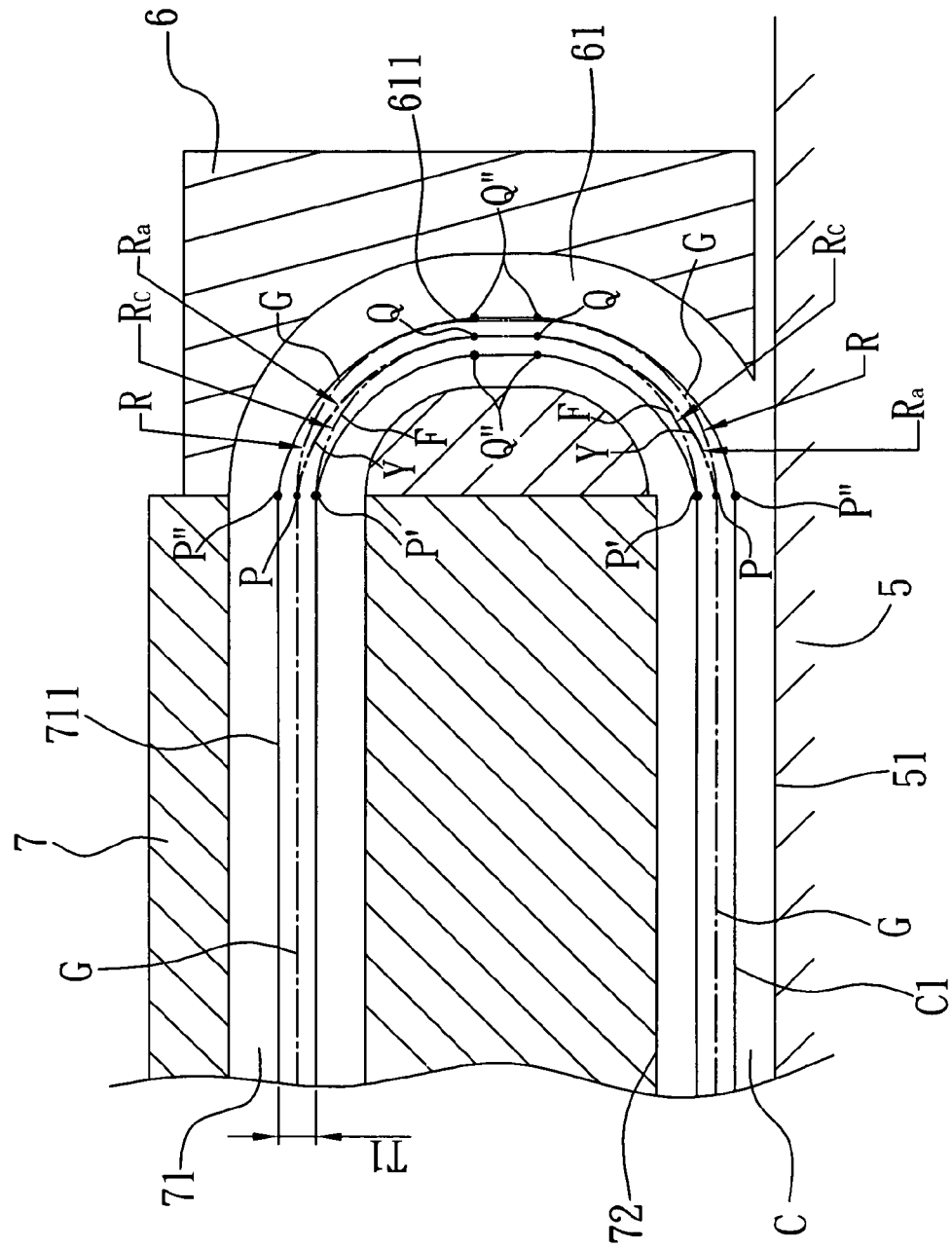
FIG. 9 is a cross section of the guiding groove path for the linear guideway in accordance with the present invention.

Finally, referring to FIGS. 8-9, based on the above-mentioned facts, the point P and the point Q are respectively the two end points of the center line Y of the third guiding groove 611, and the center line Y of the third guiding groove 611 is tangential to the rolling element chain path G at point Q. Hence, based on the similar triangle principle, the return radius Ra of the center line Y of the third guiding groove 611 can be calculated as follows. Firstly, connecting the points P, Q to define a line segment PQ; next, drawing a bisector vertical to the line segment PQ through the mid-point S of the line segment PQ, and finally, extending the bisector to intersect with the extending line of the line segment OQ at point O'. As a result, it can be fund that the triangle ΔPOQ is similar to the triangle ΔO'SQ. Since the triangle ΔPOQ and the triangle ΔO'SQ both have a right angle M, N respectively and a common angle ∠SQ O', ∠PQO, so the triangle ΔPOQ is similar to the triangle ΔO'SQ. Hence, Ra, R, and Rc satisfy the relation:

$$\frac{Rc}{\sqrt{R^2+Rc^2}} = \frac{0.5 \times \sqrt{R^2+Rc^2}}{Ra}$$

The return radius of curvature Ra of the center line Y of the third guiding groove 611 can be obtained from the above equation:

$$Ra = \frac{0.5 \times (R^2+Rc^2)}{Rc}$$

To summarize, the center line Y of the third guiding groove 611 is designed to overlap with a return route along which the linking portion 82 circulates (spacers 81), namely the center line Y of the third guiding groove 611 is identical with the return route of the linking portion 82.

As compared with the prior art, the present invention has the following advantages:

1. The linking portion of the rolling element chain of the present invention is unlikely to interfere with the guiding grooves of the circulating channels, thus making the rolling element chain circulate more smoothly.

2. When the slide block vertically moves toward the ground, the linking portion will not blend excessively, thus extending the service life of the linking portion.

3. When the slide block vertically moves toward the ground, no fracture will be caused to the linking portion, thus making the rolling element chain move more smoothly.

While we have shown and described various embodiments in accordance with the present invention, it is clear to those skilled in the art that further embodiments may be made without departing from the scope of the present invention.

What is claimed is:

1. A circulating structure for a linear guideway being arranged in a circulating assembly of the linear guideway, the linear guideway comprising:
   a slide rail being provided with at least one rolling groove at each of two opposite sides thereof;
   a slide block being movably mounted on the slide rail and provided with rolling channels opposite to the rolling grooves of the slide rail, the rolling channels and the rolling grooves defining a loaded path including two first guiding grooves, the slide block being further provided with a circulating hole which doesn't intersect with the rolling channels, the circulating hole being provided with two second guiding grooves;
   two circulating assemblies being respectively arranged at two opposite ends of the slide block, each circulating assembly being provided with a circulating channel, both ends of the circulating channel of each circulating assembly being linked up with the loaded path and the circulating hole to define a closed circulating path, the circulating channel of each circulating assembly being provided with two third guiding grooves, which are linked up with the second guiding grooves and the first guiding grooves to define a closed guiding groove system with a constant width; and
   plural rolling elements being installed in a rolling element chain to form a rolling element system, the rolling element chain being provided for separating the rolling elements from one another, the rolling element chain including at least one spacer and one linking portion, the rolling element system being arranged in the loaded path, the circulating hole and the circulating channels, the linking portion of the rolling element chain being arranged in the guiding groove system, a width of the guiding groove system being larger than a width of the linking portion, a return route along which the linking portion circulates overlapping with a center line of each of the third guiding grooves; wherein:
   the rolling elements within the respective circulating channels include a return radius of curvature R, a rolling element return center O, a part of the rolling element chain within the circulating channel includes a return radius of curvature Rc of the linking portion of the rolling element chain, the center line Y of each of the third guiding grooves includes two end points at two ends of the return route, between the two end points of the center line Y of each of the third guiding grooves and the rolling element center O are the rolling element return radius of curvature R and the return radius of curvature Rc of the linking portion of the rolling element chain, respectively;
   the return radius of curvature Rc of the linking portion of the rolling element chain, the rolling element return radius of curvature R, a diameter D of the rolling elements and a closest distance H between two rolling elements satisfy the relation:

$$R_c = \sqrt{R^2 - (D/2 + H/2)^2}.$$

2. The circulating structure for a linear guideway as claimed in claim 1, wherein a return radius of curvature Ra of the center line of each of the third guiding grooves, the return radius of curvature Rc of the linking portion of the rolling element chain, and the rolling element return radius of curvature R satisfy the relation:

$$Ra = \frac{0.5 \times (R^2 + Rc^2)}{Rc}.$$

3. A circulating structure for a linear guideway being arranged in a circulating assembly of the linear guideway, the linear guideway comprising:
  a slide rail being provided with at least one rolling groove at each of two opposite sides thereof;
  a slide block being movably mounted on the slide rail and provided with rolling channels opposite to the rolling grooves of the slide rail, the rolling channels and the rolling grooves defining a loaded path including two first guiding grooves, the slide block being further provided with a circulating hole which doesn't intersect with the rolling channels, the circulating hole being provided with two second guiding grooves;
  two circulating assemblies being respectively arranged at two opposite ends of the slide block, each circulating assembly being provided with a circulating channel, both ends of the circulating channel of each circulating assembly being linked up with the loaded path and the circulating hole to define a closed circulating path, the circulating channel of each circulating assembly being provided with two third guiding grooves, which are linked up with the second guiding grooves and the first guiding grooves to define a closed guiding groove system with a constant width; and
  plural rolling elements being installed in a rolling element chain to form a rolling element system, the rolling element chain being provided for separating the rolling elements from one another, the rolling element chain including at least one spacer and one linking portion, the rolling element system being arranged in the loaded path, the circulating hole and the circulating channels, the linking portion of the rolling element chain being arranged in the guiding groove system, a width of the guiding groove system being larger than a width of the linking portion, a return route along which the linking portion circulates overlapping with a center line of each of the third guiding grooves; wherein:
  the rolling elements within the respective circulating channels include a return radius of curvature R, a rolling element return center O, a part of the rolling element chain within the circulating channel includes a return radius of curvature Rc of the linking portion of the rolling element chain, the center line Y of each of the third guiding grooves includes two end points at two ends of the return route, between the two end points of the center line Y of each of the third guiding grooves and the rolling element center O are the rolling element return radius of curvature R and the return radius of curvature Rc of the linking portion of the rolling element chain, respectively;
  a return radius of curvature Ra of the center line of each of the third guiding grooves, the return radius of curvature Rc of the linking portion of the rolling element chain, and the rolling element return radius of curvature R satisfy the relation:

$$Ra = \frac{0.5 \times (R^2 + Rc^2)}{Rc}.$$

* * * * *